Figure 1:
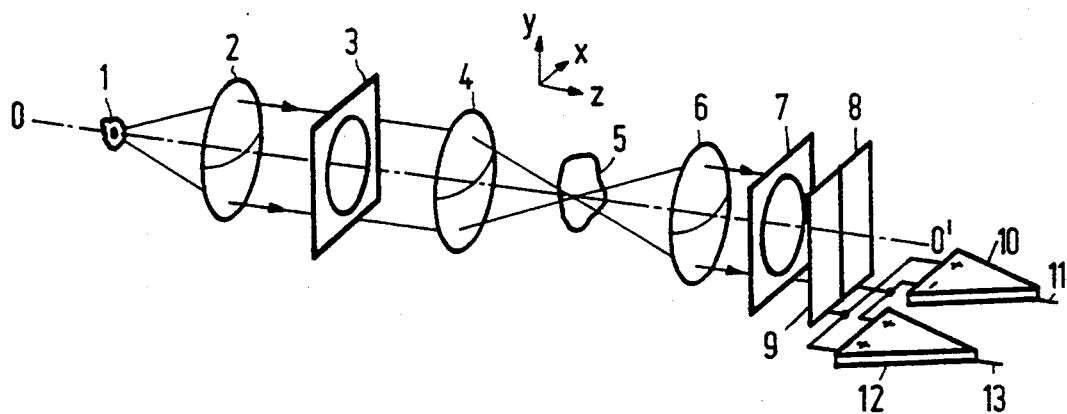

United States Patent [19]

Smid

[11] Patent Number: 5,450,501
[45] Date of Patent: Sep. 12, 1995

[54] APPARATUS FOR THE POINT-BY-POINT SCANNING OF AN OBJECT

[75] Inventor: Albert Smid, Eindhoven, Netherlands

[73] Assignee: U.S. Philips Corporation, New York, N.Y.

[21] Appl. No.: 167,423

[22] Filed: Jan. 5, 1993

Related U.S. Application Data

[63] Continuation of Ser. No. 754,171, Nov. 29, 1990, abandoned, which is a continuation of Ser. No. 239,097, Aug. 31, 1988, abandoned.

[30] Foreign Application Priority Data

Sep. 3, 1987 [NL] Netherlands ............................ 8702071

[51] Int. Cl.⁶ ............................................. G06K 9/00
[52] U.S. Cl. ........................... 382/260; 364/724.05; 364/726; 369/44.41; 382/280
[58] Field of Search ............... 382/43, 54; 364/724.1, 364/724.5, 724.6, 724.01, 724.04, 724.05, 726; 369/46, 101, 109, 23, 110, 44.41

[56] References Cited

U.S. PATENT DOCUMENTS

| | | | |
|---|---|---|---|
| 3,962,721 | 6/1976 | de Haan | 369/46 |
| 4,020,333 | 4/1977 | Nussbaumer | 364/724.01 |
| 4,051,527 | 9/1977 | Braat | 369/46 |
| 4,446,548 | 5/1984 | Bouwhuis et al. | 369/109 |
| 4,791,590 | 12/1988 | Ku et al. | 364/726 |

*Primary Examiner*—Leo H. Boudreau
*Attorney, Agent, or Firm*—Paul R. Miller

[57] ABSTRACT

A scanning microscope comprises a system (2, 3, 4) for concentrating a radiation beam from a radiation source (1) to form a scanning spot on an object (5). The radiation from the scanning spot is projected by a second optical system (6, 7) onto a radiation-sensitive detection system comprising two detectors (8, 9). The signals from the detectors (8, 9) are combined into a difference signal 11 and a sum signal 13. These two signals are formed into a complex composite signal which is transferred to the frequency domain in a circuit 22 via a Fourier transform. By performing suitable filtrations on the composite signal in the frequency domain in the circuit 23, quantitative measurements can be performed on the amplitude and phase structure of the object 5. These measurements may be visualized after an inverse Fourier transform in the circuit 24 via an image-processing system 25 on an image display unit 26.

3 Claims, 2 Drawing Sheets

APPARATUS FOR THE POINT-BY-POINT SCANNING OF AN OBJECT

This is a continuation of application Ser. No. 07/754,171, filed Nov. 29, 1990, now abandoned, which is a continuation of application Ser. No. 07/239,097, filed Aug. 31, 1988, now abandoned.

The invention relates to an apparatus for the point-by-point scanning of an object, which apparatus comprises a radiation source for supplying a scanning beam, an objective system for focussing the scanning beam to form a radiation spot on the object, a radiation-sensitive detection system for converting the radiation from the scanning spot into electric signals, and an electronic processing unit, said detection system comprising two radiation-sensitive detectors each supplying an electric signal.

An apparatus of this type is known from U.S. Pat. No. 4,446,548.

The electronic processing unit in the known apparatus produces a phase shift in the electric output signals of the radiation-sensitive detectors, which phase shift is so large that the resultant output signal, after combination in a summation circuit, is optimized. However, in this way the known apparatus does not utilize a number of facilities in the field of quantitative and qualitative measurements on an object provided by a microscope having such a radiation-sensitive detection system. It is an object of the invention to provide an apparatus, which is improved in this respect, for the point-by-point scanning of an object.

To this end the apparatus according to the invention is characterized in that the electronic processing unit is adapted to perform frequency-selective filtrations of a signal composed of the electric signals.

It has been found that after such a filtration the properties of an object can be quantitatively reproduced in a relatively simple way. After filtering out a single frequency, the presence or absence of this frequency and hence of a corresponding periodical spatial structure is directly recognizable in the filtered signal.

Since the difference of the output signals of the two radiation-sensitive detectors has a differential character, slopes on the surface of the object are visualized. By selecting a number of frequencies from a frequency band by means of suitable filtration it is possible to convert this slope-signal into a height-signal, whereby the height can also be determined quantitatively for objects having a low contrast.

It is also to be noted that substantially any object is a combination of a phase and an amplitude structure. By means of a suitable filtration it is possible to reproduce the extent of phase shift in such an object quantitatively. It is also possible to reproduce the optimum signal, that is to say the signal having a maximum response, as described in the above-cited United States Patent. The optimum signal can be determined after the filtration while the electronic processing unit does not have to be adapted in advance to the properties of the object to be scanned, which is in contradistinction to the known apparatus.

The invention states as a last advantage of the apparatus that the modulation transfer function (MTF), the relative suppression of frequencies in the picked up signal due to limitations of the optical system, can be corrected. These corrections may be performed separately for the various components of the composite signal.

An embodiment of the apparatus according to the invention is characterized in that the electronic processing unit is adapted to form the composite signal in accordance with $S = S_1 + jS_2$ in which S is the composite signal, $S_1$ is a first real function and $S_2$ is a second real function of the two electric signals and j is the imaginary unit.

This embodiment may be further characterized in that the first real function is the sum of the two electric signals and the second real function is the difference between the two electric signals. The signal to be filtered is composed of the amplitude signal and the differential phase contrast signal and both signals are simultaneously filtered, which yields a given time gain.

The apparatus according to the invention is further characterized in that the frequency-selective filtrations of the composite signal are effected in the frequency domain and in that the composite electric signal is converted to the frequency domain by means of a discrete Fourier transform. A suitable discrete Fourier transform is, for example, the known "Fast Fourier Transform" (FFT). If desired, the filtration can be performed therewith in a fast manner and hence simultaneously when scanning the object. If the properties of the object to be measured relate to the spatial periodicity and hence to the relative intensity of frequencies in the signal, it is sufficient to perform the operations. However, by performing an inverse Fourier transform, possibly after several further operations in the frequency domain, the filtered signal can be converted again to the spatial domain and, if desired, it can be visualized in this domain as an image of the object. Due to the filtrations certain aspects of the object are clearly made recognizable in this image.

The apparatus according to the invention is preferably characterized in that the electronic processing unit comprises a programmable computer which is suitable for storing instructions therein and for performing instructions for at least a part of the frequency-selective filtrations. By performing the required signal processing operations with the aid of a programmable computer, known numerical methods of performing a Fourier transform can be used and a given filtration can be exchanged for another filtration in a simple and flexible way.

It is to be noted that the apparatus according to the invention is not limited to an optical scanning microscope, but the invention may alternatively be used in scanning apparatus in which the radiation beam used is an acoustic beam, an X-ray beam or a particle beam, for example, an electron beam.

Figure 2:
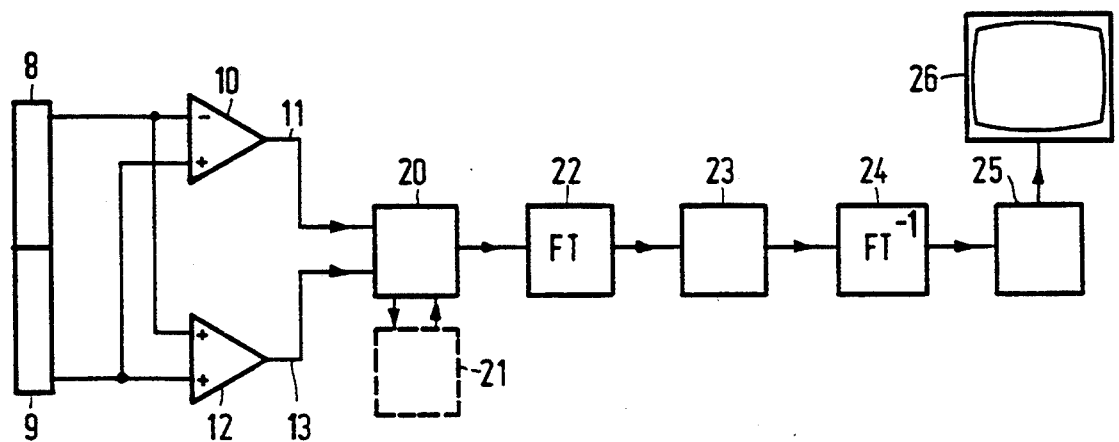
Figure 3A:
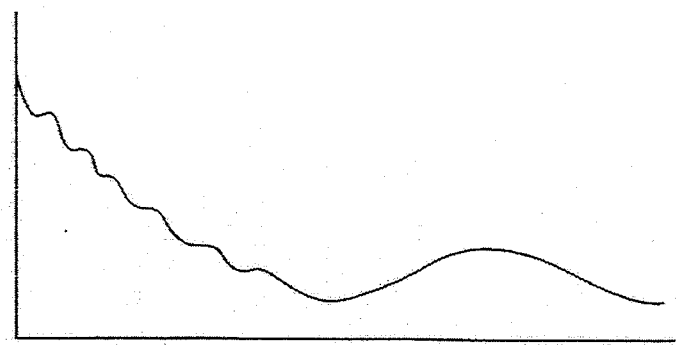
Figure 3B:
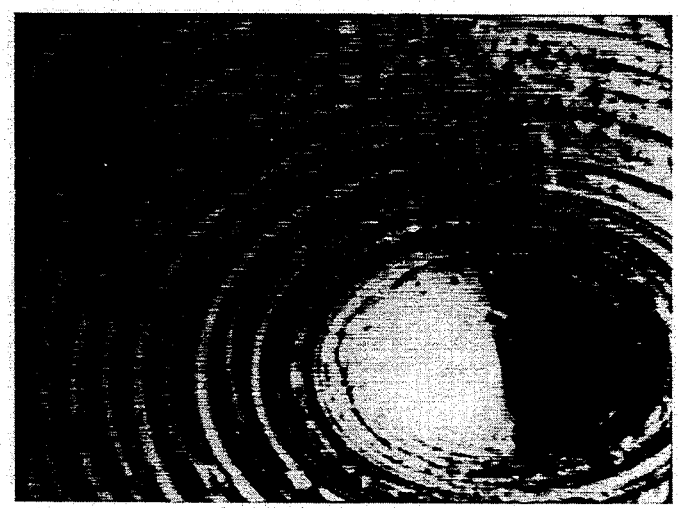
Figure 3C:
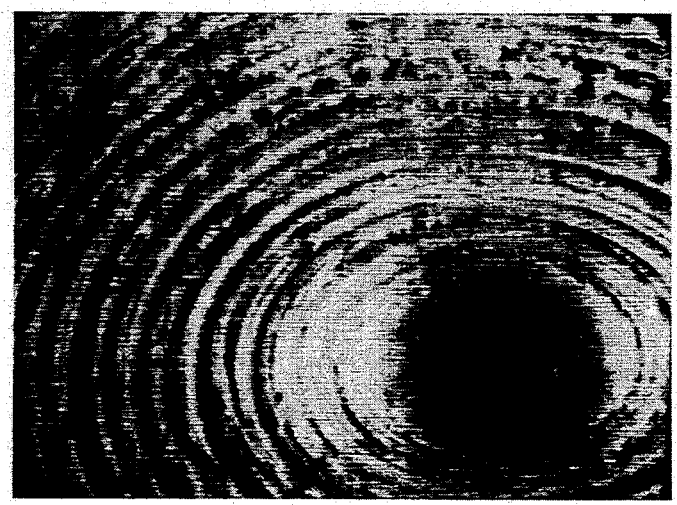

The invention will now be described in greater detail by way of example with reference to the accompanying drawings in which FIG. 1 shows diagrammatically the composition of a scanning microscope according to the invention, FIG. 2 shows the various operating steps which are undergone by the measured signals, FIGS. 3a, 3b and 3c show the profile of a surface and an image of the surface before and after performing the operations in the apparatus according to the invention.

In FIG. 1, the reference numeral 1 denotes a monochromatic radiation source, for example, a semiconductor laser. The radiation beam generated by this radiation source is converted into a parallel beam by the collimator lens 2. This beam traverses the diaphragm 3 and is concentrated by the objective lens 4 to form a scanning spot on the object 5. The radiation from the scanning spot is projected by the lens 6 via the diaphragm 7 onto the radiation-sensitive detection system comprising the detectors 8 and 9. The diaphragms 3 and 7 are arranged in such a way that they are imaged on each other by the lenses 4 and 6. The detectors 8 and 9 are arranged directly behind the diaphragm 7, the bounding line between the two detectors intersecting the optical axis 0-0' of the system.

The microscope has a scanning mechanism (not shown) with which the object 5 and the scanning spot can be moved point-by-point with respect to each other. This scanning system may comprise, for example a movable support with which the object 5 is moved with respect to the optical system or with movable mirrors arranged in the radiation path with which the scanning spot can be moved across the object.

The detectors 8 and 9 convert the radiation from the scanning spot, which for each scanned point is modulated in accordance with the amplitude and phase structure of the object in that point, into electric signals which are combined in the differential amplifier 10 to a differential phase contrast signal 11 and in the summation amplifier 12 to an amplitude signal 13.

Although the scanning apparatus is described with reference to optical elements, a scanning apparatus using radiation of a different kind for analyzing an object, for example an electron beam, an acoustic beam or an X-ray beam is alternatively possible.

FIG. 2 illustrates in which way the detected differential phase contrast and amplitude signals 11 and 13 are processed to a quantitative image of the object 5 in the apparatus according to the invention. The signals 11 and 13 are applied to a combination circuit 20 which combines the signals to a complex signal whose real part corresponds to the amplitude signal 13 and whose imaginary part corresponds to the differential phase contrast signal 11. Such a signal is generated for each of the scanned points.

A discrete Fourier transform, for example a fast Fourier transform, is performed on signals from the scanned points on a scanning line in the circuit 22, so that the signals are analyzed into a plurality of discrete frequency components. A filtration is performed on this frequency spectrum in the filtering circuit 23 whereafter the filtered or modified frequency spectrum is converted again into a spatial signal in the next circuit 24 via an inverse discrete Fourier transform. These spatial signals are subsequently visualized by means of an image-processing system 25 on an image display unit 26, for example a video-monitor or a printer.

More complicated operations are possible by storing the measured signals in a memory 21. These stored signals may be combined at a later stage with the signals from an adjacent scanning line. In this manner it is possible to perform, for example filtrations and corrections which cover the two-dimensional surface of the object.

FIGS. 3a, 3b and 3c illustrate the result provided by the apparatus according to the invention. A surface whose height profile is shown in FIG. 3a is shown unprocessed in FIG. 3b. In this Figure slopes with a positive coefficient of direction can be recognized as light areas and the slopes having a negative coefficient of direction can be recognized as dark areas. FIG. 3c shows the same surface after the signals have been filtered in the apparatus according to the invention. In this Figure the higher portions of the surface are dark and the relatively lower portions are light.

What is claimed is:

1. In an apparatus for visualizing structure of an object by point-by-point scanning of the object, processing a signal obtained by said scanning so as to select and enhance a physical characteristic of said object, and displaying a selected characteristic, the structure comprising
    (a) radiation source means for supplying a radiation beam,
    (b) means for focusing said radiation beam into a radiation spot on an object,
    (c) means for scanning said radiation spot relative to said object,
    (d) radiation-sensitive detection means for converting radiation from said radiation spot on said object into two electrical signals, said detection means including two radiation-sensitive detectors, each of said detectors supplying one of said electrical signals, and
    (e) electronic processing means for processing said two electrical signals into a signal representing a physical characteristic of said object,
    wherein the improvement comprises said electronic processing means including in sequence:
    (1) circuit means for combining said two electrical signals into a composite signal identifying both an amplitude and a differential phase for each spot-like area of said object momentarily scanning by said scanning radiation spot,
    (2) circuit means for converting said composite signal for each area into a frequency spectrum of all scan areas of one scan line,
    (3) circuit means for filtering said frequency spectrum into a modified frequency spectrum,
    (4) circuit means for converting said modified frequency spectrum into a spatial signal representing a selected characteristic, and
    (5) circuit means for processing said spatial signals of a succession of scan lines into visual display signals.

2. An apparatus according to claim 1, wherein display means receiving said visual display signals is disposed for visually displaying said spatial signals.

3. An apparatus according to claim 1, wherein further circuit means are disposed in connection with said circuit means (1) for storing each of said electrical signals.

* * * * *